United States Patent [19]

Lis

[11] 4,235,414
[45] Nov. 25, 1980

[54] ELECTROMAGNETIC VALVE FOR FLUID CIRCUITS CONTAINING IMPURITIES

[75] Inventor: Jean Z. Lis, 44, rue du Temple, 75004 Paris, France

[73] Assignees: Societe Industrielle de Boulogne, Boulogne; Jean Z. Lis, Paris, both of France

[21] Appl. No.: 943,986

[22] Filed: Sep. 20, 1978

[30] Foreign Application Priority Data

Sep. 28, 1977 [FR] France ................................. 77 29195

[51] Int. Cl.³ .......................................... F16K 31/385
[52] U.S. Cl. ...................................... 251/24; 251/30; 251/46
[58] Field of Search ............................. 251/46, 24, 30

[56] References Cited

U.S. PATENT DOCUMENTS

| | | |
|---|---|---|
| 2,417,994 | 3/1947 | Sheets ..................................... 251/24 |
| 2,459,403 | 8/1969 | Royer ................................. 251/46 X |
| 2,890,714 | 6/1959 | Greenwood ........................ 251/24 X |
| 3,346,004 | 10/1967 | Costello ............................. 251/46 X |
| 3,893,475 | 7/1975 | Hudson .............................. 251/46 X |

*Primary Examiner*—Arnold Rosenthal
*Attorney, Agent, or Firm*—Browdy and Neimark

[57] ABSTRACT

The valve comprises a flap controlled in function of the pressure prevailing in a chamber limited by the flap in accordance with an escape circuit being opened or closed by an electro-magnet. The inlet of the escape circuit comprises a filter operatively mounted on the flap to be movable therewith, and the passage cross-sections of the escape circuit are greater than the biggest impurities able to pass through the filter.

3 Claims, 6 Drawing Figures

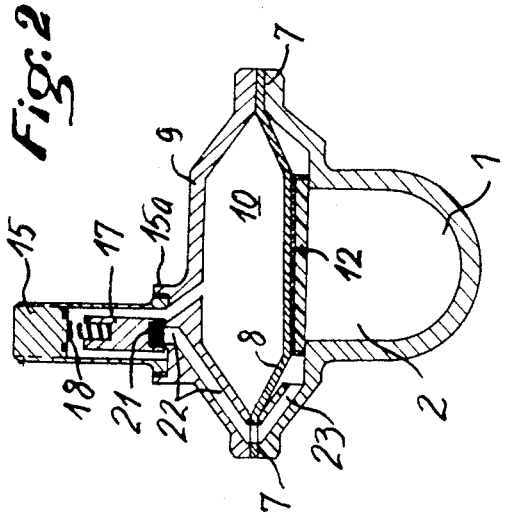
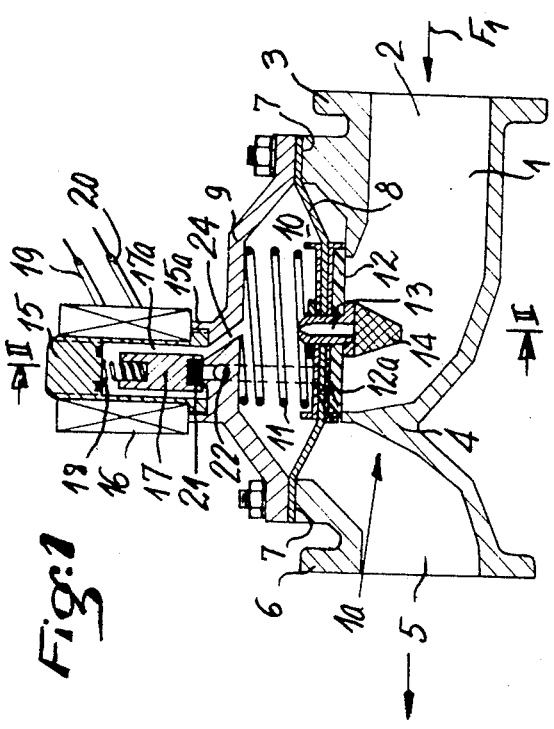
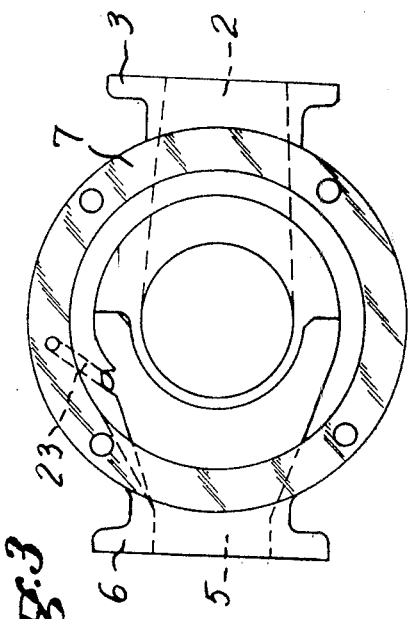

ELECTROMAGNETIC VALVE FOR FLUID CIRCUITS CONTAINING IMPURITIES

The present invention has for its object an electromagnetic valve having a small consumption of electric power and which is provided to be mounted in fluid circuits containing impurities of various sizes, with these impurities risking to clog, on the one hand, the filter mounted on the control of the valve and, on the other hand, the various conducts of the valve.

In crop watering arrangements, the water which is used is more often taken from a river, a channel, a stream or other water pool or water way, by a pump, and the water so pumped carries along some sand, fine gravels or other mineral wastes or still portions of plants, which very rapidly are the cause of a clogging of the control conducts of the valves distributing the water to the various stations provided longitudinally of the crops or in the crops. Samely some impurities are carried along with the fluid used as cutting oil in machine tools and, very rapidly, the valve or valves controlling the delivery of this fluid are put out of order.

Valves are already known, particularly electromagnetic valves, which comprise a static filter preventing the various impurities to come to the control conducts of the valves, but these static filters are very rapidly clogged, and it is necessary to stop all the device and to periodically dismantle the valve bodies for declogging the filter. This work is long, difficult and is very much time consuming, both because of the maintainance work and because the stoppage of the machine in question.

The present invention copes with these disadvantages by providing an electromagnetic valve controlled by an electromagnet having a small consumption of electric power which opens the control circuit of the valve, this control circuit being protected by a non static filter mounted on the movable closing means of the valve in order to obtain the declogging of the filter at each movement of the closing means. Further, the diameter of the control circuit and the arrangement of the escape channel enable to prevent any clogging.

According to the invention, in a flap valve of which the opening and closing are controlled by a differential pressure produced by opening and respectively closing an escape circuit, the escape circuit comprises channel means provided within the flap which carries at inlet of said channel a filter protruding in the circulating circuit of the valve.

Various other features of the invention are moreover shown in the following description.

An embodiment of the invention is shown as a non limitative example in the accompanying drawings, in which:

FIG. 1 is a longitudinal cross-section of the electromagnetic valve in closed position;

FIG. 2 is a cross-section taken along line II—II of FIG. 1;

FIG. 3 is a plane view of the main body of the valve;

Figure 5:
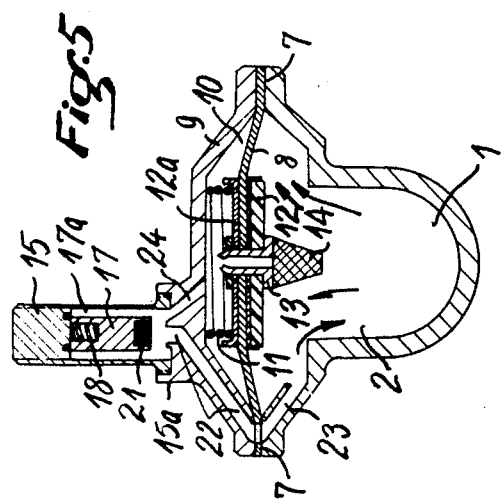
FIG. 5 is a cross-section taken along line V—V of FIG. 4.

In FIG. 1, the main body 1 of the flap valve comprises a fluid inlet 2 terminating by a flange 3 or other connecting means enabling to connect the valve body on a fluid supply pipe. A partition 4 is vertically mounted within the main valve body so to divide said body into two parts, i.e. the inlet 2 and the outlet 5 of the valve body. The outlet 5 also comprises a flange or other means 6 enabling to connect the valve body to a pipe assembly leading to the device using the fluid passing through the valve and for example a crop watering system.

The upper part 1a of the valve body comprises a circular flange 7 on which bears a circular flexible and deformable membrane 8 which is maintained on the valve body by a cover 9 forming a housing 10 for constituting, between the membrane 8 and the upper portion of the cover, an upper chamber in which is positioned a spring 11. The spring 11, bearing under the cover 9, tends to downwardly push the membrane 8 of which the central part is reinforced by a seat 12 and a bearing plate 12a with the membrane 8 being sanwiched therebetween. The bearing plate 12a which is mounted above the membrane has raised edges for housing and maintaining the lower part of the spring 11.

The assembly made by the seat 12, membrane 8 and bearing plate 12a is bored in its center with a hole into which is housed a jet or nozzle 13 of which the lower part carries mounted thereupon a tapered filter 14 while the upper part of the jet comes into the chamber 10. The cover 9 carries, substantially in its center, a guard 15 maintaining the coil 16 of an electro-magnet of which the plunger core 17 is vertically movable in a chamber 17a and is downwardly biased by a spring 18 bearing on the upper part of the guard 15.

Reference numbers 19, 20 designate electric leads for supplying power to the coil 16. The plunger core 17 carries at its lower part a flexible and deformable pad 21 bearing on the upper part of a channel 22 bored into the cover 9. As shown in FIG. 2 channel 22 is extended by a channel 23 in the main valve body 1 at the outlet side thereof and the channel 23 (see FIG. 3) is inclined with respect to the axis of the valve and the mouth opens behind a step 5a of the main valve body 1. There is thus created, upon passage a stream of fluid in the valve body, a suction or vacuum effect and therefore a permanent aspiration effect causing a fall of pressure in the channels 23 and 22 as well as in the upper chamber 10 which communicates with the channels 22, 23 via, the chamber 17a in which is housed the plunger core 17 and the channel 24 in the cover 9. It is important that the passage cross-section in any point of the escape or leak circuit as hereinbefore described always be greater than the size of the biggest particles passing through the filter 14.

Figure 4:
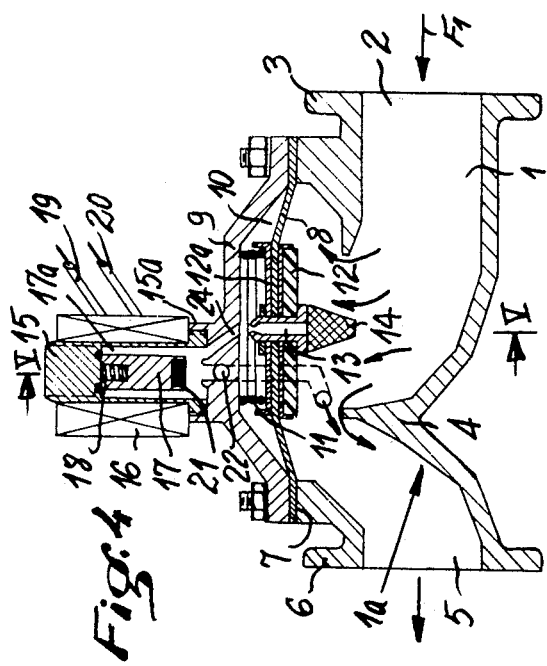
FIG. 4 is a longitudinal cross-section of the valve of FIG. 1 but with the valve in open position.
Figure 6:
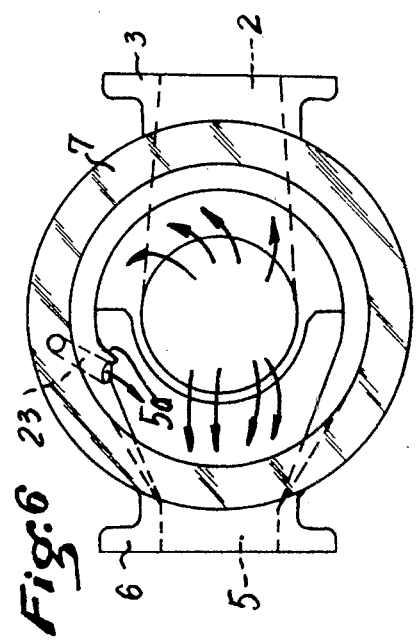
FIG. 6 is a plane view of the valve body showing the flow of fluid when the valve is open.

When the valve is mounted in a pipe with the fluid passing in the direction of the arrow $F_1$ (FIG. 1), and when the coil 16 is suitably activated, the plunger core 17 is upwardly moved against the spring 18, (FIG. 4) which causes a fall in pressure in the chamber 10 and passage of fluid through the filter 14, the jet 13, the channel 24, the chamber 17a and the channels 22, 23, to escape through the outlet 5 of the valve body. This fall in pressure causes a raise of the membrane 8 by deformation of the membrane and, upon this time, the components of the valve are in the position shown at FIG. 4.

The main flow of fluid thus directly passes from the inlet 2 to the outlet 5, but some fluid permanently passes through the filter 14, the jet or nozzle 13, the chamber 10, the channel 24, the chamber 17a, the channels 22, 23. The particular arrangement of the escape channel 23

(see FIGS. 3 and 4) causes a permanent aspiration or suction as indicated above, this aspiration being due to the passage of the main stream. It results therefrom that the filter 14, the jet or nozzle 13, the channels 24, 23, 22 as well as the chamber 17a are always under a small vacuum, and even if impurities will pass with the fluid, these impurities are aspirated and evacuated towards the outlet 5 of the valve body.

Upon the closing and opening operations of the main valve comprising the seat 12, the filter 14 is abruptly moved, either from bottom to top or from top to bottom. It results therefrom that the impurities which are fixed on the periphery of the filter are energically shaked and fall while causing a declogging of the filter, which declogging is also permanently made during working of the valve due to the vortex effect of the fluid in the vicinity of the filter as shown by arrows around the filter.

There is thus obtained and electro-valve which cannot be blocked by impurities, and the maintainance of the electro-valve is thus reduced at a minimum.

I claim:

1. A flap valve having an axis and including a flap, the opening and closing of which are controlled by a differential pressure produced by opening and respectively closing an escape circuit, and wherein said escape circuit comprises channel means within said flap, a filter protruding in the circulating circuit of the valve being mounted on said flap at an inlet of said channel means, said escape circuit further defining a channel coming to an outlet pipe of the valve and being obliquely directed with respect to said axis of the valve for producing a suction effect in said escape circuit upon circulation of a fluid in the valve in opened position while providing an aspiration and consequently a continuous circulation of fluid through said filter and the complete escape circuit, said escape circuit further having at least one point thereof a passage cross-section greater than the largest size of particles which are to pass through said filter; and wherein said flap is of a membrane type and includes a membrane with a bearing plate mounted onto said membrane, a seat for the valve and a spring means biasing said bearing plate towards said seat, an electromagnetic core being further provided for obturating said escape circuit and thereby closing the valve.

2. A flap valve means as set forth in claim 1, wherein said filter protrudes in body of the valve from a median portion of said flap, a jet being further provided in said channel within said flap.

3. A flap valve having an axis and including a flap, the opening and closing of which are controlled by a differential pressure produced by opening and respectively closing an escape circuit, and wherein said escape circuit comprises channel means within said flap, a filter protruding in the circulating circuit of the valve being mounted on said flap at an inlet of said channel means, said escape circuit further defining a channel coming to an outlet pipe of the valve and being obliquely directed with respect to said axis of the valve for producing a suction effect in said escape circuit upon circulation of a fluid in the valve in opened position while providing an aspiration and consequently a continuous circulation of fluid through said filter and the complete escape circuit, said escape circuit further having at least one point thereof a passage cross-section greater than the largest size of particles which are to pass through said filter, and wherein said filter protrudes in body of the valve from a mediam portion of said flap, a jet being further provided in said channel means within said flap.

* * * * *